United States Patent

Neubauer

(10) Patent No.: US 12,435,779 B1
(45) Date of Patent: Oct. 7, 2025

(54) TWO-SPEED COAXIAL ROLLING DIFFERENTIAL WITH PLUS-STEP PLANET AND SPUR GEAR STAGE WITH STEPPED RING GEAR FOR SUPER DUTY TRUCK APPLICATIONS

(71) Applicant: Schaeffler Technologies AG & Co. KG, Herzogenaurach (DE)

(72) Inventor: Benedikt Neubauer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/625,778

(22) Filed: Apr. 3, 2024

(51) Int. Cl.
- *F16H 37/08* (2006.01)
- *B60K 1/00* (2006.01)
- *F16H 1/28* (2006.01)

(52) U.S. Cl.
CPC ...... *F16H 37/082* (2013.01); *B60K 2001/001* (2013.01); *F16H 2001/2881* (2013.01); *F16H 2200/0021* (2013.01); *F16H 2200/0034* (2013.01); *F16H 2200/0007* (2013.01)

(58) Field of Classification Search
CPC ........... F16H 37/082; F16H 2200/0021; F16H 2200/0034; F16H 2200/0007; F16H 2001/2881; B60K 2001/001; B60K 2007/0092; B60K 17/046
USPC .......................... 475/150, 204, 338, 317, 320
See application file for complete search history.

(56) References Cited

U.S. PATENT DOCUMENTS

| | | | | |
|---|---|---|---|---|
| 4,040,312 | A * | 8/1977 | Tappan | F16H 47/04 475/342 |
| 5,807,205 | A * | 9/1998 | Odaka | F16H 63/483 477/901 |
| 8,419,579 | B2 * | 4/2013 | Rosemeier | B60K 6/48 475/339 |
| 9,777,816 | B2 * | 10/2017 | Petersen | B60L 15/2054 |
| 10,760,653 | B2 * | 9/2020 | Schilder | B60K 1/00 |
| 10,995,835 | B2 | 5/2021 | Engerman | |
| 11,067,152 | B2 * | 7/2021 | Biermann | F16H 3/66 |
| 11,679,670 | B2 | 6/2023 | Liu | |
| 11,739,819 | B2 | 8/2023 | Uehara | |
| 2003/0010547 | A1 * | 1/2003 | Wachauer | H02K 23/60 180/65.1 |
| 2009/0111641 | A1 | 4/2009 | Kim | |
| 2009/0182474 | A1 | 7/2009 | Ross | |
| 2011/0287884 | A1 | 11/2011 | Unno | |

(Continued)

FOREIGN PATENT DOCUMENTS

| DE | 102018101269 A1 | 7/2019 |
|---|---|---|
| DE | 102018120446 A1 | 2/2020 |

(Continued)

OTHER PUBLICATIONS

Woodgears.ca [online] 2014 [retrieved Dec. 3, 2024] Retrieved from the Internet: <(https://woodgears.ca/gear/ratio.html) 2014.

*Primary Examiner* — Roger L Pang
(74) *Attorney, Agent, or Firm* — Volpe Koenig

(57) ABSTRACT

An electric beam axle includes an electric motor, a shiftable reducer, and a rolling differential. The shiftable reducer includes a planetary gearset and the rolling differential includes a compound planetary gearset and a spur gear stage. The electric motor, shiftable reducer and rolling differential are aligned coaxially providing a radially compact electric beam axle.

12 Claims, 2 Drawing Sheets

(56) References Cited

U.S. PATENT DOCUMENTS

2020/0096084 A1 3/2020 Engerman
2024/0225366 A1 7/2024 Chupka

FOREIGN PATENT DOCUMENTS

DE 102019131764 A1 5/2021
JP 2002104001 A * 4/2002

* cited by examiner

TWO-SPEED COAXIAL ROLLING DIFFERENTIAL WITH PLUS-STEP PLANET AND SPUR GEAR STAGE WITH STEPPED RING GEAR FOR SUPER DUTY TRUCK APPLICATIONS

FIELD OF INVENTION

The present disclosure related to a drivetrain for a vehicle. It is particularly concerned with a two-speed gear train for an electric axle for an electric or hybrid vehicle.

BACKGROUND

Electric beam axles are used in hybrid and electric vehicles to transfer rotational energy from an electric motor to the wheels of the vehicle, causing the vehicle to propel in a specified direction. Electric beam axles include the electric motor and the gearing/gearbox required to transfer the rotational energy from the electric motor to the wheels of the vehicle. Based on design requirements, there is a limited space envelope in which the electric motor and the gearing/gearbox must be positioned within the electric beam axle. In addition, electric beam axles for truck applications often require high and low range gearing capabilities for normal and high torque driving conditions, respectively. Therefore, there is a need for an electric beam axle that can efficiently fit the electric motor and the gearing/gearbox for a hybrid and/or electric vehicle within a limited space envelope while maintaining full functionality and high and low range gearing capabilities.

SUMMARY

In one aspect, the present disclosure is directed to an electric beam axle for a hybrid or electric vehicle. The electric beam axle includes an electric motor, and a rolling differential operatively coupled to the electric motor. The rolling differential includes a compound planetary gearset and a spur gear stage, a first output of the compound planetary gear set is connectable to a first vehicle wheel and a second output of the compound planetary gear set is connectable to a second vehicle wheel via the spur gear stage.

The axle can include a shiftable reducer operatively coupled between the electric motor and the rolling differential. The electric motor, shiftable reducer and rolling differential can be coaxially aligned. The shiftable reducer can include planetary gearset. The planetary gearset can include a sun gear coupled to an output of the shiftable reducer, a plurality of stepped planet gears positioned radially outwards from the first sun gear with respect to an axis of rotation of the electric beam axle on a planet carrier, each of the plurality of stepped planet gears are configured to mesh with the sun gear, and a ring gear positioned radially outwards of the plurality of stepped planet gears, wherein each of the plurality of stepped planet gears are configured to mesh with the stationary first ring gear. Each of the plurality of stepped planet gears can include a large planet gear and a small planet gear, wherein the large planet gear is meshed with the sun gear and the small planet gear is meshed with the ring gear. A carrier shaft of the carrier of the compound planetary gearset can be connectable to a first wheel of the axle via a first axle half-shaft and the ring gear of the compound planetary gearset can be connectable to a second wheel of the axle via the spur gear stage and a second axle half-shaft. The shiftable can reducer include an input shaft, and each of the input shaft, the first axle half-shaft, and the second axle half-shaft can be axially aligned with the axis of rotation of the of the electric beam axle. The planetary gearset of the shiftable reducer can have a first position with a gear ratio of between about 3:1 and 7:1, and a second position with a gear ratio of 1:1.

In accordance with another aspect of the present disclosure, a two-speed shiftable differential comprises a shiftable reducer having an input shaft for receiving rotational energy, and a rolling differential driven by an output of the shiftable reducer. The rolling differential includes a compound planetary gearset and a spur gear stage, a first output of the compound planetary gearset connectable to a first vehicle wheel and a second output of the compound planetary gear set connectable to a second vehicle wheel via the spur gear stage.

The shiftable reducer and rolling differential can be coaxially aligned. The shiftable reducer can include a planetary gearset. The planetary gearset can include a sun gear coupled to an output of the shiftable reducer, a plurality of stepped planet gears positioned radially outwards from the first sun gear with respect to an axis of rotation of the electric beam axle on a planet carrier, each of the plurality of stepped planet gears are configured to mesh with the sun gear, and a ring gear positioned radially outwards of the plurality of stepped planet gears, wherein each of the plurality of stepped planet gears are configured to mesh with the stationary first ring gear. Each of the plurality of stepped planet gears can include a large planet gear and a small planet gear, wherein the large planet gear can be meshed with the sun gear and the small planet gear can be meshed with the ring gear. A carrier shaft of the carrier of the compound planetary gearset can be connectable to a first wheel via a first axle half-shaft and the ring gear of the compound planetary gearset can be connectable to a second wheel via the spur gear stage and a second axle half-shaft. The shiftable reducer can include an input shaft, and each of the input shaft, the first axle half-shaft, and the second axle half-shaft can be axially aligned. The planetary gearset of the shiftable reducer can have a first position with a gear ratio of between about 3:1 and 7:1, and a second position with a gear ratio of 1:1.

BRIEF DESCRIPTION OF THE DRAWING(S)

The foregoing Summary as well as the following Detailed Description will be best understood when read in conjunction with the appended drawings, which illustrate a preferred embodiment according to the disclosure. In the drawings.

DETAILED DESCRIPTION OF THE PREFERRED EMBODIMENT(S)

Figure 1:
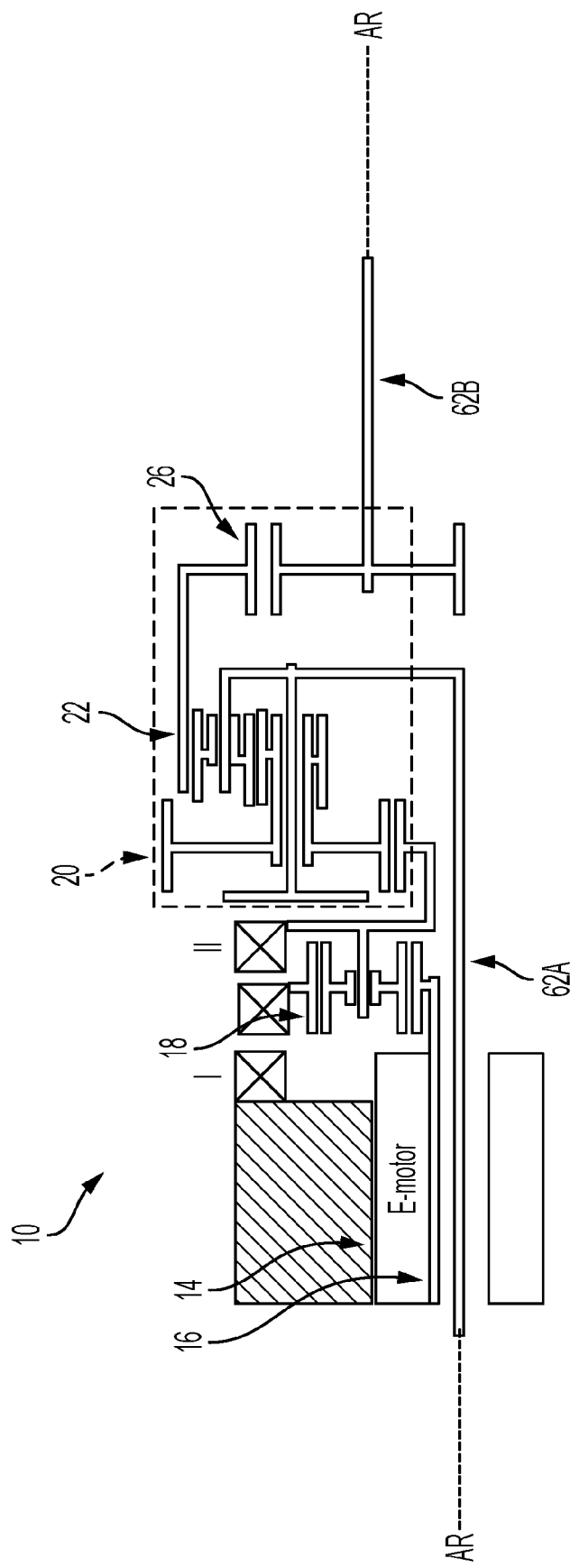
FIG. 1 is a schematic illustration of an exemplary electric beam axle for a hybrid and/or electric vehicle.

Certain terminology is used in the following description for convenience only and is not limiting. The words "front", "rear", "upper", and "lower" designate directions in the drawings to which reference is made. The words "inwardly" and "outwardly" refer to directions towards and away from parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terms "generally" and "approximately" are to be construed as within 10% of a stated value or ratio. The terminology includes the words specifically noted above, derivatives thereof, and words of similar import.

FIG. 1 is a schematic illustration of an exemplary electric beam axle 10 for use in a hybrid and/or electric vehicle. FIG. 1 schematically illustrates only one half of a gearbox of the electric beam axle 10, but it is to be understood that at least some of the components and features of the gearbox are axially aligned with and surround an axis of rotation AR of the electric beam axle 10, discussed further below. In some examples, the axis of rotation AR can be an axis of rotation of wheels/tires 12 coupled to the electric beam axle 10. Further, the electric beam axle 10 will hereinafter be referred to as the "axle 10", but it is to be understood that the "electric beam axle 10" and the "axle 10" are used synonymously to refer to the same component/assembly.

The axle 10 is a beam axle for a hybrid and/or electric vehicle (i.e. a hybrid and/or electric automobile), and the axle 10 is configured to transfer rotational energy from an electric motor 14 to the wheels/tires 12 of the vehicle. In some embodiments, the axle 10 can be a front axle of the hybrid and/or electric vehicle. In other examples, the axle 10 can be a rear axle of the hybrid and/or electric vehicle.

As shown in FIG. 1, the axle 10 includes the electric motor 14 and a gear train for coupling the electric motor 14 to the wheels 12. The electric motor 14 can be an electric motor that converts electrical energy into mechanical energy, such as for example rotational energy that is provided to an output shaft of the electric motor 14. In some examples, the electric motor 14 can surround and be positioned concentric with the axis of rotation AR of the axle 10.

An input shaft 16 extends between and couples the electric motor 14 to a shiftable reducer in the form of a simple planetary gearset 18. More specifically, the input shaft 16 is coupled at a first end to the output shaft of the electric motor 14 for receiving rotational energy from the output shaft of the electric motor 14. The input shaft 16 is coupled at a second end to the simple planetary gearset 18 for transferring the rotational energy from the electric motor 14 to the simple planetary gearset 18, discussed further below. In some examples, the input shaft 16 can be a hollow shaft that is axially aligned with the axis of rotation AR of the axle 10.

A rolling differential 20 in the form of a compound planetary gearset 22 and spur gear stage 26 is aligned coaxially with the electric motor 14 and the simple planetary gearset 18. In exemplary embodiments, as illustrated, the compound planetary gearset 22 and the spur gear stage 26 are coaxially aligned along the axis of rotation AR of the axle 10. This configuration is particularly well-suited for applications having limited radial installation space as it allows for a radially compact form factor.

Figure 2:
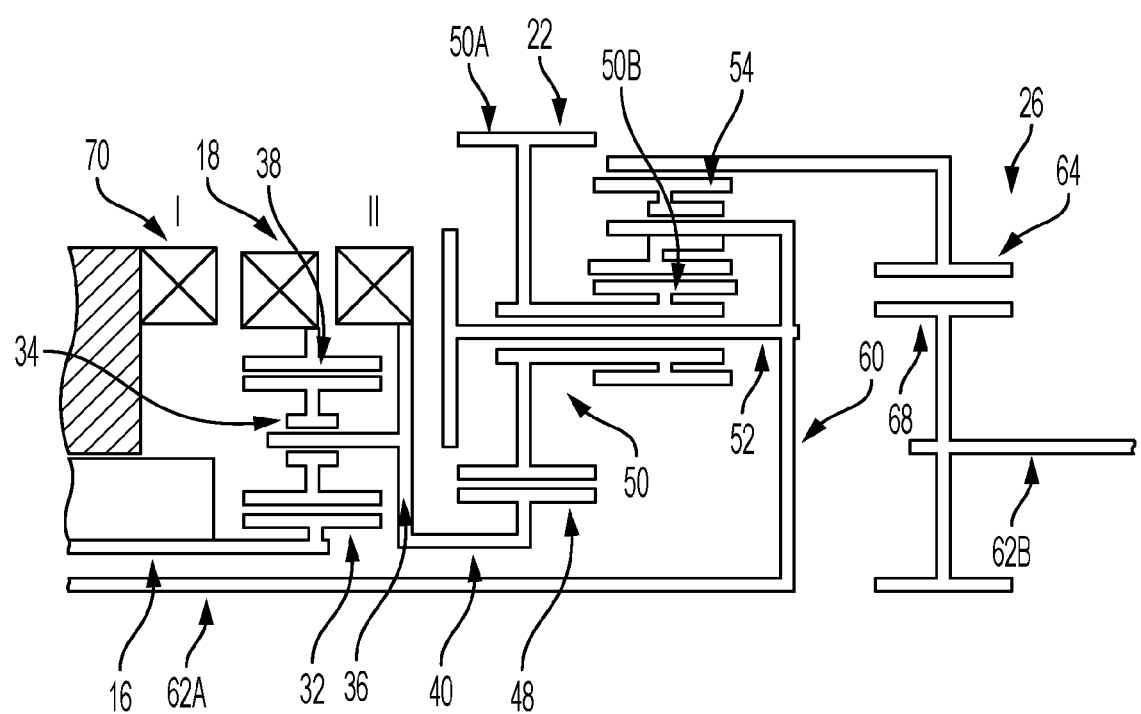
FIG. 2 is a magnified detail view of a portion of the exemplary electric beam axle of FIG. 1.

Referring now to FIG. 2, which is a magnified detail view of the gearbox of the axle 10, the simple planetary gearset 18 includes a sun gear 32 coupled to the input shaft 16, a plurality of planet gears 34, a planet carrier 36, a ring gear 38, and a planet carrier shaft 40. The planet carrier shaft 40 is coupled to a sun gear 48 of the compound planetary gearset 22. The compound planetary gearset 22 includes a plurality of stepped planet gears 50 supported on a planet carrier 52. The stepped planet gears 50 have a large planet gear 50A and a small planet gear 50B. The small planet gears 50B are coupled with a ring gear 54 via a secondary planet gear 56. A planet carrier shaft 60 of the planet carrier 52 is coupled to a first (left) wheel 12 via axle half-shaft 62A and the ring gear 54 is coupled to a second (right) wheel via the spur gear stage 26 and axle half-shaft 62B. It will be appreciated that the spur gear stage 26 may generally include a simple helical spur gear 68 meshed with a helical ring gear 64 configured to produce a −1 ratio with respect to the carrier shaft 60 thus achieving differential drive functionality characteristics between the left and right wheels 12.

In operation, a clutch 70 of the simple planetary gearset 18 is operative to shift the simple planetary gearset 18 between position II (e.g., closed) having a 1:1 ratio for normal (high) range operations, and position I (e.g., open) having a ratio of, for example, 1:4, for low-range operations. It will be appreciated that other gear ratios are possible. When combined with the gearing reduction of the compound planetary gearset 22, a combined gear ratio of i-20 can be realized for normal operations and a combined gear ratio of i-60 can be realized for low range operations. Of course, the actual combined gear ratios can differ based on the particular gear reductions of the components of the axle 10.

Further, the coaxial configuration of the components of axle 10 of the present disclosure results in a simpler and more radially-compact gearing design that still includes the desired gear ratio ranges typical used by, for example, superduty trucks. To this end, the coaxial arrangement of the electric motor 14, rolling differential 20 and simple planetary gearset 18 provides an axle 10 having a dimension in a radial direction (relative to axis AR) that is minimized compared to other axle configurations utilizing multiple compound planetary gearsets and/or an additional planetary gearset to provide the differential drive characteristics, for example.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 Electric Beam Axle
12 Wheels/Tires
14 Electric Motor
16 Input Shaft
18 Simple Planetary Gearset
20 Rolling Differential
22 Compound Planetary Gearset
26 Spur Gear Stage
32 Sun Gear
34 Planet Gears
36 Planet Carrier
38 Ring Gear
40 Planet Carrier Shaft
48 Sun Gear
50 Stepped Planet Gears
50A Large Planet Gear 50B Small Planet Gear
52 Planet Carrier
54 Ring Gear
56 Secondary Planet Gear
60 Planet Carrier Shaft
62A First Axle Shaft
62B Second Axle Shaft
64 Ring Gear
68 Spur Gear
70 Clutch

What is claimed is:

1. An electric beam axle for a hybrid or electric vehicle, the electric beam axle comprising:
    an electric motor;
    a rolling differential; and
    a shiftable reducer operatively coupled between the electric motor and the rolling differential;
    wherein the rolling differential includes a compound planetary gearset and a spur gear stage, a first output of the compound planetary gear set connectable to a first vehicle wheel and a second output of the compound planetary gear set connectable to a second vehicle wheel via the spur gear stage;
    wherein the compound planetary gearset comprises:
    a sun gear coupled to an output of the shiftable reducer;
    a plurality of stepped planet gears positioned radially outwards from the first sun gear with respect to an axis of rotation of the electric beam axle on a planet carrier, each of the plurality of stepped planet gears are configured to mesh with the sun gear; and
    a ring gear positioned radially outwards of the plurality of stepped planet gears, wherein each of the plurality of stepped planet gears are coupled with the first ring gear via a secondary planet gear.

2. The electric beam axle of claim 1, wherein the electric motor, shiftable reducer and rolling differential are coaxially aligned.

3. The electric beam axle of claim 1, wherein the shiftable reducer includes a planetary gearset.

4. The electric beam axle of claim 1, wherein each of the plurality of stepped planet gears includes a large planet gear and a small planet gear, wherein the large planet gear is meshed with the sun gear and the small planet gear is meshed with a respective secondary planet gear.

5. The electric beam axle of claim 4, wherein a carrier shaft of the carrier of the compound planetary gearset is connectable to a first wheel of the axle via a first axle half-shaft and the ring gear of the compound planetary gearset is connectable to a second wheel of the axle via the spur gear stage and a second axle half-shaft.

6. The electric beam axle of claim 3, wherein the planetary gearset of the shiftable reducer has a first position with a gear ratio of between about 3:1 and 7:1, and a second position with a gear ratio of 1:1.

7. A two-speed shiftable differential comprising:
    a shiftable reducer having an input shaft for receiving rotational energy; and
    a rolling differential driven by an output of the shiftable reducer;
    wherein the rolling differential includes a compound planetary gearset and a spur gear stage, a first output of the compound planetary gearset connectable to a first vehicle wheel and a second output of the compound planetary gear set connectable to a second vehicle wheel via the spur gear stage;
    wherein the compound planetary gearset comprises:
    a sun gear coupled to an output of the shiftable reducer;
    a plurality of stepped planet gears positioned radially outwards from the first sun gear with respect to an axis of rotation of the electric beam axle on a planet carrier, each of the plurality of stepped planet gears are configured to mesh with the sun gear; and
    a ring gear positioned radially outwards of the plurality of stepped planet gears, wherein each of the plurality of stepped planet gears are coupled with the first ring gear via a secondary planet gear.

8. The differential of claim 7, wherein the shiftable reducer and rolling differential are coaxially aligned.

9. The differential of claim 8, wherein the shiftable reducer includes a planetary gearset.

10. The differential of claim 7, wherein each of the plurality of stepped planet gears includes a large planet gear and a small planet gear, wherein the large planet gear is meshed with the sun gear and the small planet gear is meshed with a respective secondary planet gear.

11. The differential of claim 10, wherein a carrier shaft of the carrier of the compound planetary gearset is connectable to a first wheel via a first axle half-shaft and the ring gear of the compound planetary gearset is connectable to a second wheel via the spur gear stage and a second axle half-shaft.

12. The differential of claim 9, wherein the planetary gearset of the shiftable reducer has a first position with a gear ratio of between about 3:1 and 7:1, and a second position with a gear ratio of 1:1.

* * * * *